US011729197B2

(12) United States Patent
Cruz et al.

(10) Patent No.: US 11,729,197 B2
(45) Date of Patent: Aug. 15, 2023

(54) ADAPTIVE VULNERABILITY MANAGEMENT BASED ON DIVERSE VULNERABILITY INFORMATION

(71) Applicant: T-Mobile USA, Inc., Bellevue, WA (US)

(72) Inventors: Pradeep Cruz, Issaquah, WA (US); Jan Olav Opedal, Ellensburg, WA (US); Srikrishna Srinivasan, Issaquah, WA (US); Yanbing Su, Frisco, TX (US)

(73) Assignee: T-Mobile USA, Inc., Bellevue, WA (US)

( * ) Notice: Subject to any disclaimer, the term of this patent is extended or adjusted under 35 U.S.C. 154(b) by 829 days.

(21) Appl. No.: 16/688,915

(22) Filed: Nov. 19, 2019

(65) Prior Publication Data

US 2021/0152588 A1 May 20, 2021

(51) Int. Cl.
*H04L 29/06* (2006.01)
*H04L 9/40* (2022.01)
*G06F 8/65* (2018.01)

(52) U.S. Cl.
CPC ............ *H04L 63/1433* (2013.01); *G06F 8/65* (2013.01)

(58) Field of Classification Search
CPC ............................... H04L 63/1433; G06F 8/65
USPC ....................................................... 726/25
See application file for complete search history.

(56) References Cited

U.S. PATENT DOCUMENTS

| 8,099,787 | B2 | 1/2012 | Vasudeva |
| 8,789,192 | B2 | 7/2014 | Labumbard |
| 9,692,778 | B1 | 6/2017 | Mohanty |
| 9,846,780 | B2 | 12/2017 | Tonn et al. |
| 9,871,815 | B2 | 1/2018 | Ouchn |
| 9,990,501 | B2 | 6/2018 | McGee et al. |
| 10,050,991 | B2 | 8/2018 | Htay |
| 10,089,473 | B2 | 10/2018 | Mahrous et al. |
| 10,140,453 | B1 | 11/2018 | Fridakis |
| 10,754,958 | B1 * | 8/2020 | Sidagni ................. G06F 21/552 |
| 2015/0161393 | A1 * | 6/2015 | Pistoia .................... G06F 21/74 726/25 |
| 2019/0147167 | A1 | 5/2019 | Kim et al. |
| 2020/0120126 | A1 * | 4/2020 | Ocepek ............... H04L 63/1433 |

* cited by examiner

*Primary Examiner* — Evans Desrosiers
(74) *Attorney, Agent, or Firm* — Perkins Coie LLP

(57) ABSTRACT

Embodiments include a method for vulnerability management of a computer system. The method includes collecting vulnerability information over a network from a publishing source. The vulnerability information includes a known vulnerability of a first computer asset, where at least some of the vulnerability information is a set of cybersecurity vulnerabilities and exposures (CVEs) published online. Further, at least some of the CVEs is in a human-readable format. The method further includes collecting system information of the computer system subject to the vulnerability management, where the system information includes information about a second computer asset of the computer system. The method further includes processing the collected vulnerability information and the collected system information by interpreting the human-readable CVEs and correlating the interpreted CVEs with the collected system information. A potential vulnerability of the second computer asset is identified based on the correlation between the interpreted CVEs and the collected system information.

20 Claims, 12 Drawing Sheets

Affected Products

Vulnerable Products

This vulnerability affects Cisco ASA Software running on the following products:

- Cisco ASA 1000V Cloud Firewall
- Cisco ASA 5500 Series Adaptive Security Appliances
- Cisco ASA 5500-X Series Next-Generation Firewalls
- Cisco ASA Services Module for Cisco Catalyst 6500 Series Switches and Cisco 7600 Series Routers
- Cisco Adaptive Security Virtual Appliance (ASAv)
- Cisco Firepower 9300 ASA Security Module
- Cisco ISA 3000 Industrial Security Appliance Refer to the "Fixed Software" section of this security advisory for more information about affected releases.

*FIG. 2A*

Fixed Releases

In the following table, the left column lists major releases of Cisco ASA Software. The right column indicates whether a major release is affected by the vulnerability described in this advisory and the first release that includes the fix for this vulnerability.

| Cisco ASA Software Major Release | First Fixed Release |
|---|---|
| Prior to 9.0* | Affected, migrate to 9.1(7.12) or later |
| 9.0* | Affected, migrate to 9.1(7.12) or later |
| 9.1 | 9.1(7.12) or later |
| 9.2 | 9.2(4.18) or later |
| 9.3* | Affected, migrate to 9.4(3.12) or later |
| 9.4 | 9.4(3.12) or later |
| 9.5 | 9.5(3.2) or later |
| 9.6 | 9.6(2.2) or later |
| 9.7 | Not affected |
| 9.8 | Not affected |

*Cisco ASA Software releases prior to 9.1 and Cisco ASA Software Release 9.3 have reached end-of-software maintenance. Customers should migrate to a supported release.

*FIG. 2B*

CVE ID CVE-2017-6607 has been assigned to document this issue.

Additional information on Cisco's security vulnerability policy can be found at the following URL:
http://www.cisco.com/en/US/products/products_security_vulnerability_policy.html

Was the description about this Bug Helpful? ★★★★☆ (1)

∨ Details

Last Modified: Feb 23, 2018

Status: Fixed

Severity: 2 Severe

Product: (1)
Cisco ASA 5500-X Series Firewalls

Support Cases: 45

Known Affected Releases: (1)
9.1(7)

Known Fixed Rele
100.15(0.136)
100.13(0.149)
100.11(0.75)
100.8(40.129)
97.1(12.7)
97.1(11.1)
97.1(6.28)
97.1(0.50)
96.2(0.94)

Download software
5500-X Series Fir

*FIG. 2C*

```
"CVE_data_meta" : {
  "ID" : "CVE-2017-6607",
  "ASSIGNER" : "cve@mitre.org"
},
"affects" : {
 "vendor" : {
  "vendor_data" : [ {
    "vendor_name" : "cisco",
    "product" : {
     "product_data" : [ {
       "product_name" : "adaptive_security_appliance_software",
       "version" : {
        "version_data" : [ {
          "version_value" : "9.0.1"
        }, {
          "version_value" : "9.0.2"
        }, {
          "version_value" : "9.0.2.10"
        },
```

*FIG. 2D*

```xml
<ProductTree xmlns="http://docs.oasis-open.org/csaf/ns/csaf-cvrf/v1.2/prod">
  <Branch Type="Vendor" Name="Cisco">
    <Branch Type="Product Name" Name="Cisco Adaptive Security Appliance (ASA) Software">
      <FullProductName ProductID="CVRFPID-6588">Cisco Adaptive Security Appliance (ASA) Software </FullProductName>
    </Branch>
  </Branch>
</ProductTree>
```

*FIG. 2E*

```xml
    <Branch Type="Service Pack" Name="15.4(1)SY3">
        <FullProductName ProductID="CVRFPID-228056">Cisco IOS 15.4SY 15.4(1)SY3</FullProductName>
    </Branch>
  </Branch>
  <Branch Type="Product Version" Name="15.5SY">
    <Branch Type="Service Pack" Name="15.5(1)SY">
        <FullProductName ProductID="CVRFPID-225786">Cisco IOS 15.5SY 15.5(1)SY</FullProductName>
    </Branch>
  </Branch>
</Branch>
<Branch Type="Product Name" Name="Cisco IOS XE Software">
  <Branch Type="Product Version" Name="3.3SG">
    <Branch Type="Service Pack" Name="3.3.0SG">
        <FullProductName ProductID="CVRFPID-188726">Cisco IOS XE Software 3.3SG 3.3.0SG</FullProductName>
    </Branch>
    <Branch Type="Service Pack" Name="3.3.2SG">
        <FullProductName ProductID="CVRFPID-196228">Cisco IOS XE Software 3.3SG 3.3.2SG</FullProductName>
    </Branch>
    <Branch Type="Service Pack" Name="3.3.1SG">
        <FullProductName ProductID="CVRFPID-196287">Cisco IOS XE Software 3.3SG 3.3.1SG</FullProductName>
    </Branch>
  </Branch>
</Branch>
```

*FIG. 2F*

ADAPTIVE VULNERABILITY MANAGEMENT BASED ON DIVERSE VULNERABILITY INFORMATION

BACKGROUND

Vulnerability management is integral to computer and network security. Vulnerability management refers to the cyclical practice of identifying, classifying, prioritizing, remediating, and mitigating vulnerabilities of computer systems. For example, a computer system's outdated or defective software components are vulnerable to attack or failure. A scanner system can discover vulnerabilities. For example, software agents distributed on computer assets of a computer system can search for known vulnerabilities, such as open ports, unsecure configurations, or susceptibility to malware. However, scanners are unreliable because they treat all computer systems the same way to look for the same signatures of vulnerabilities, which can differ across diverse computer systems.

Central to vulnerability management is the publication of "cybersecurity vulnerabilities and exposures" (CVEs), which can include lists of computer assets that pose security vulnerabilities and exposures. CVEs can use a common scheme to share information about known vulnerabilities across separate organizations, tools, repositories, and services. For example, an organization's vulnerability management system (VMS) can consult a public source such as the National Institute of Standards and Technology (NIST)'s national vulnerability database (NVD), which collects and curates CVE advisories from various vendors of computer assets. The NVD uses common names for known vulnerabilities that are not specific to particular organizations or computer systems.

A VMS can mitigate vulnerabilities by causing a computer system to update equipment, software, or configurations. For example, a VMS can change a network security policy, reconfigure software, or otherwise educate users about vulnerabilities. In the case of software, a VMS can identify and install a software patch. In addition to having high false positive/negative rates, existing solutions cannot readily identify suitable security patches for specific computer assets to mitigate a risk of the vulnerability. Hence, existing solutions cannot address specific risks faced by particular organizations.

BRIEF DESCRIPTION OF THE DRAWINGS

Embodiments of the present technology will be described and explained through the use of the accompanying drawings.

FIG. 2A depicts a CVE corresponding to a product security incident response team (PSIRT) advisory including a set of vulnerable products.

FIG. 2B depicts a CVE corresponding to a PSIRT advisory including a set of patches for known vulnerabilities.

FIG. 2C depicts a CVE corresponding to a bug report including details regarding the state of a known vulnerability.

FIG. 2D depicts a CVE in a JavaScript object notation (JSON) format obtained from the National Institute of Standards and Technology (NIST)'s national vulnerability database (NVD).

FIG. 2E depicts a CVE corresponding to a CISCO common vulnerability reporting framework (CVRF) in extensible markup language (XML) format (non-IOS).

FIG. 2F depicts a CVE corresponding to a CISCO CVRF XML file (IOS/IOS XE).

Figure 1:
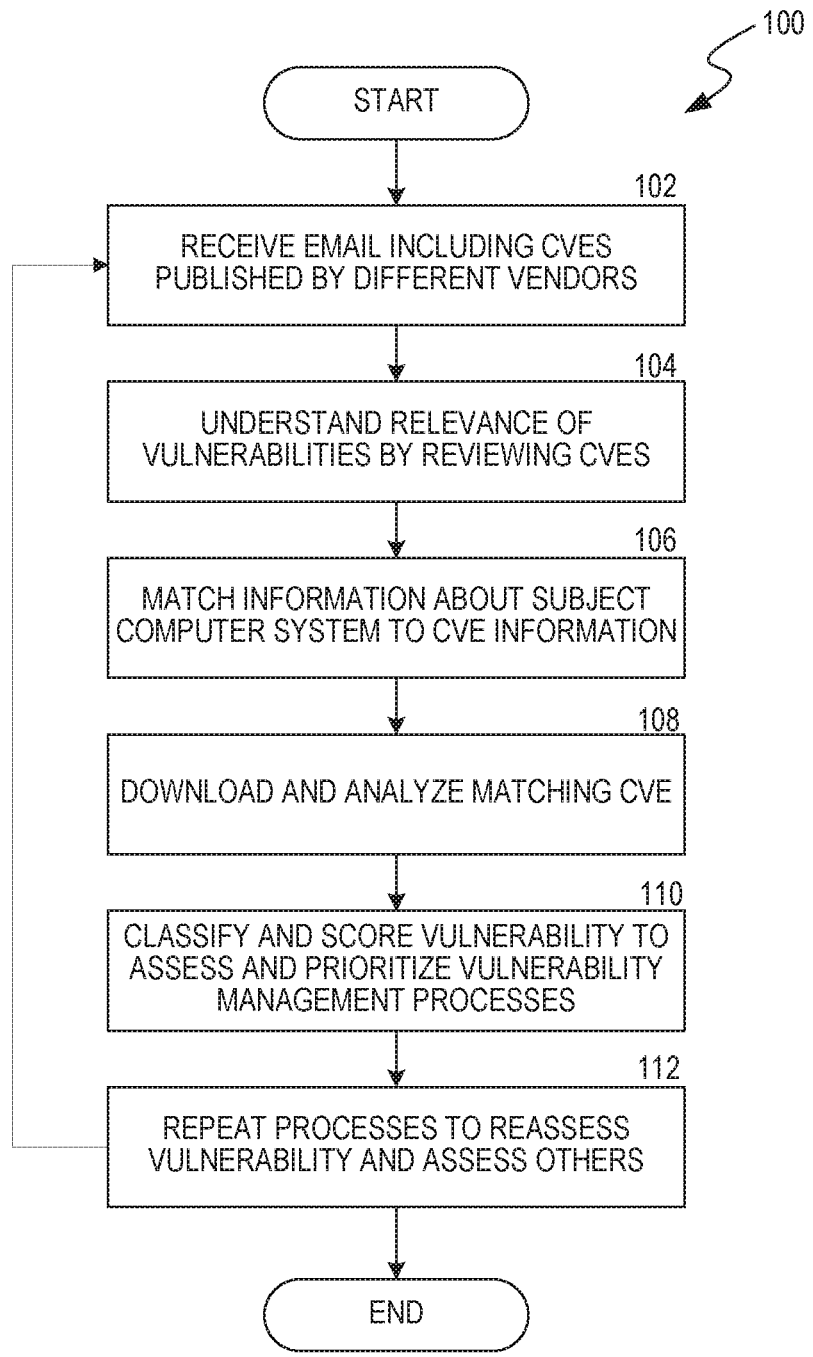
FIG. 1 is a flow diagram of a cybersecurity vulnerabilities and exposure (CVE) analysis that can be performed manually.

The drawings, some components and/or operations can be separated into different blocks or combined into a single block when discussing some embodiments of the present technology. Moreover, while the technology is amenable to various modifications and alternative forms, specific embodiments have been shown by way of example in the drawings and are described in detail below. The intention, however, is not to limit the technology to the particular embodiments described herein. On the contrary, the technology is intended to cover all modifications, equivalents, and alternatives falling within the scope of the technology as defined by the appended claims.

DETAILED DESCRIPTION

The disclosed vulnerability management system (VMS) can automatically and periodically adapt to vulnerability information obtained from sources that (i) have direct knowledge of vulnerabilities and/or (ii) publish vulnerability information. For example, the sources can be vendors of computer assets (e.g., hardware, software) that publish information about any vulnerabilities of their assets. The vulnerability information can be published online and obtained in a variety of ways from the online source such as, for example, via web scraping. The vulnerability information is typically published in a variety of formats. For example, vulnerability information is commonly published as cybersecurity vulnerabilities and exposures (CVEs) in machine-readable formats or human-readable formats.

The VMS can collect machine-readable CVEs and human-readable CVEs information from various sources including vendors and public sources such as the National Institute of Standards and Technology (NIST)'s national vulnerability database (NVD), which receives a set of published CVEs from different vendors and then provides common names for publicly known problems. In other words, the VMS can collect vulnerability information directly from venders and indirectly through intermediaries.

The VMS can collect system-specific information including an inventory of computer assets that belong to an organization's computer system. The inventory is then checked for vulnerabilities. The system-specific information can include information about hardware components, software components, and configurations (versions, settings, etc.). In some embodiments, the VMS uses natural language processing (NLP) along with machine learning (ML) to obtain accurate mappings between CVE information and system-specific information to adaptively identify potential vulnerabilities. The VMS can identify suitable and available updates or patches to mitigate the identified vulnerabilities. The VMS can also include tools for vulnerability classification and risk valuation, including an estimation of a financial risk to the organization caused by the vulnerability. In some embodiments, an analyst can access the VMS through a network portal.

Various embodiments of the disclosed systems and methods are described. The following description provides specific details for a thorough understanding and an enabling description of these embodiments. One skilled in the art will understand, however, that the invention can be practiced without many of these details. Additionally, some well-known structures or functions may not be shown or described in detail for the sake of brevity. The terminology used in the description presented below is intended to be interpreted in its broadest reasonable manner, even though it is being used in conjunction with a detailed description of certain specific embodiments of the invention.

Although not required, embodiments are described below in the general context of computer-executable instructions, such as routines executed by a general-purpose data processing device, e.g., a networked server computer, mobile device, or personal computer. Those skilled in the relevant art will appreciate that the invention can be practiced with other communications, data processing, or computer system configurations, including: Internet appliances, handheld devices, wearable computers, all manner of cellular or mobile phones, multi-processor systems, microprocessor-based or programmable consumer electronics, set-top boxes, network PCs, mini-computers, mainframe computers, media players, Internet-of-Things (IoT) devices, network connected devices, and the like. Indeed, the terms "computer," "server," and the like are generally used interchangeably herein, and refer to any of the above devices and systems, as well as any data processor.

While aspects of the disclosed embodiments, such as certain functions, can be performed exclusively or primarily on a single device, some embodiments can also be practiced in distributed environments where functions or modules are shared among disparate processing devices, which are linked through a communications network, such as a local area network (LAN), wide area network (WAN), or the Internet. In a distributed computing environment, program modules can be located in both local and remote memory storage devices.

Aspects of the invention can be stored or distributed on tangible computer-readable media, including magnetically or optically readable computer discs, hardwired or preprogrammed chips (e.g., EEPROM semiconductor chips), nanotechnology memory, biological memory, or other data storage media. In some embodiments, computer implemented instructions, data structures, screen displays, and other data under aspects of the invention can be distributed over the Internet or over other networks (including wireless networks), on a propagated signal on a propagation medium (e.g., an electromagnetic wave(s), a sound wave) over a period of time, or they can be provided on any analog or digital network (packet switched, circuit switched, or other scheme).

The disclosed embodiments overcome the drawbacks of conventional systems that have high rates of false negatives and false positives, where a vulnerability for one computer system is misinterpreted as a vulnerability in another computer system or vice versa. Moreover, conventional systems do not offer a useful qualification or indication of a degree of risk when a potential vulnerability has been identified. For example, QUALYS or other vendor(s) offer existing systems that can search for outdated versions of computer assets and then flag each outdated computer asset as a vulnerability that poses a risk to a computer system regardless of its configuration.

In general, effective vulnerability management relies heavily on venders for information about known vulnerabilities. For example, vendors can publish vulnerability information on network portals (e.g., websites) and/or send vulnerability information to the NVD, which curates vulnerability information from different sources. The published vulnerability information can also describe suggested actions to mitigate certain risks. For example, the vulnerability information can identify newer hardware, software, and/or a change to a configuration to mitigate an identified vulnerability.

Existing solutions primarily rely on the NVD as a source of vulnerability information to search for matching vulnerabilities across different organizations and then provide suggested updates. These solutions may not accurately identify which computer systems need updating because vulnerability information is not system-specific. For example, a vendor can issue a CVE for XYZ but existing systems find a different configuration such as XYZ' in a computer system. As such, existing systems would not identify XZY' as a vulnerability. Hence, addressing vulnerabilities can cause confusion because existing solutions may not know how to interpret vendor published information for specific systems.

The vulnerability information from different sources is not necessarily the same or formatted the same way. Existing solutions rely on information that can involve so many variations that the solutions cannot effectively provide the benefits of vulnerability management across diverse computer systems. For example, the vulnerability information can be published in human-readable format and, consequently, must be interpreted and is often misinterpreted. Vulnerability information in human-readable format requires a human analyst to manually analyze a CVE and determine whether the CVE is relevant to a particular organization. The analyst needs to review a vulnerability advisory, review computer assets of a subject system, and review configurations of the subject system. Given the cost-prohibitive nature of performing human reviews, the routine use of human analysts is a cost-prohibitive service for many organizations.

Interpreting human-readable CVEs tends to provide more accurate and relevant results compared to processing machine-readable CVEs. Nevertheless, existing solutions collect machine-readable vulnerabilities to avoid the need for human analysts despite the fact that human-readable information is more accurate. Machine-readable CVEs can misunderstand specific configurations of particular computer systems that could pose a risk. This occurs because machine-readable CVE is designed non-specifically for diverse computer systems. For example, The NVD facilitates automating vulnerability management across numerous organizations despite being ineffective due to variabilities, different interpretations, and system-specific combinations of hardware, software, and/or configurations. As a result, existing solutions use outdated or nonspecific vulnerability information that results in faulty vulnerability management.

Other existing solutions with similar deficiencies include a subscription to a commercial service, and tools that can automatically identify certain unknown vulnerabilities (at day zero) by performing test cases. A virus scanner is another tool that can search for known virus signatures. In addition, antivirus tools that are capable of heuristic analysis can discover undocumented malware if the antivirus tools detect anomalous activity (e.g., attempt to overwrite a system file).

FIG. 1 is a flow diagram of a CVE analysis that can be performed manually to identify, classify, prioritize, remediate, and mitigate vulnerabilities. The process 100 can be performed by a human analyst. In some instances, at least some portions of the process 100 are automated. The lack of full automation results in re-introductions of vulnerabilities because the average exposure days to detect vulnerabilities could be several months, which increases security risks and causes costly delays. For example, a critical vulnerability can have a broad impact on diverse computer systems but take several weeks to address due to the time consuming and labor-intensive human analysis. Moreover, the lack of self-serve capabilities encourages sharing vulnerability data via Excel and emails, which poses another security risk.

In 102, an organization that subscribes to a vulnerability management service can receive an email that includes a set of CVEs published by vendors. A human analyst must review each CVE in the email to identify any that are relevant to the organization's computer system. In 104, the analyst performs an assessment of the CVEs to determine whether any of the CVEs are relevant to the organization. In particular, the analyst reviews each CVE to understand, for example, whether any outdated versions of computer assets could detrimentally impact the organization's network. Based on that assessment and vender classification of vulnerabilities, the analyst can prioritize addressing vulnerabilities.

In 106, the analyst assesses the computer assets of the computer system that is subject to vulnerability management. For example, the analyst can review the organization's computer assets to determine whether versions of those assets match versions identified in the CVEs. For example, the analyst can prepare a command based on the version information in the CVEs. The computer system executes the command to collect log information to match computer assets in the computer system with the CVEs.

In 108, after the analyst has identified a matching vulnerability in the computer system, the analyst can then download the matching CVE from a vendor's website. The analyst can analyze the contents of the downloaded CVE and correlates results of system-specific information with the vendor's CVE information.

In 110, the analyst can classify and score a vulnerability based on the common vulnerability scoring system (CVSS). The CVSS describes a way to capture characteristics of a vulnerability and produce a numerical score reflecting its severity. The numerical score can be translated into a qualitative representation (e.g., low, medium, high, and critical) to help an organization assess and prioritize vulnerability management processes. Based on the classification and score, the analyst can update a vulnerability tracker and inform stakeholders of any risk.

In 112, the analyst can repeat the same analysis to reassess vulnerability and ensure that the computer system complies with the most current vender CVE updates. Moreover, the analyst can perform the same analysis for other CVEs.

FIGS. 2A through 2C depict examples of human-readable CVEs. Specifically, FIG. 2A depicts a CVE corresponding to a product security incident response team (PSIRT) advisory including a set of vulnerable products. FIG. 2B depicts a CVE corresponding to a PSIRT advisory including a set of patches for known vulnerabilities. FIG. 2C depicts a CVE corresponding to a bug report including details regarding the affected and fix software versions. The human-readable CVEs are normally reviewed manually by human analysts to understand the scope of affected computer assets and determine a potential risk to a computer system.

FIGS. 2D through 2F depict examples of machine-readable CVEs. Specifically, FIG. 2D depicts a CVE in a JavaScript object notation (JSON) format obtained from the NIST's NVD. FIG. 2E depicts a CVE corresponding to a CISCO common vulnerability reporting framework (CVRF) in extensible markup language (XML) format (non-IOS). FIG. 2F depicts a CVE corresponding to a CISCO CVRF XML file (IOS/IOS XE). The machine-readable CVEs are computer system agnostic and, as such, regularly result in false positive and false negatives.

Figure 3:
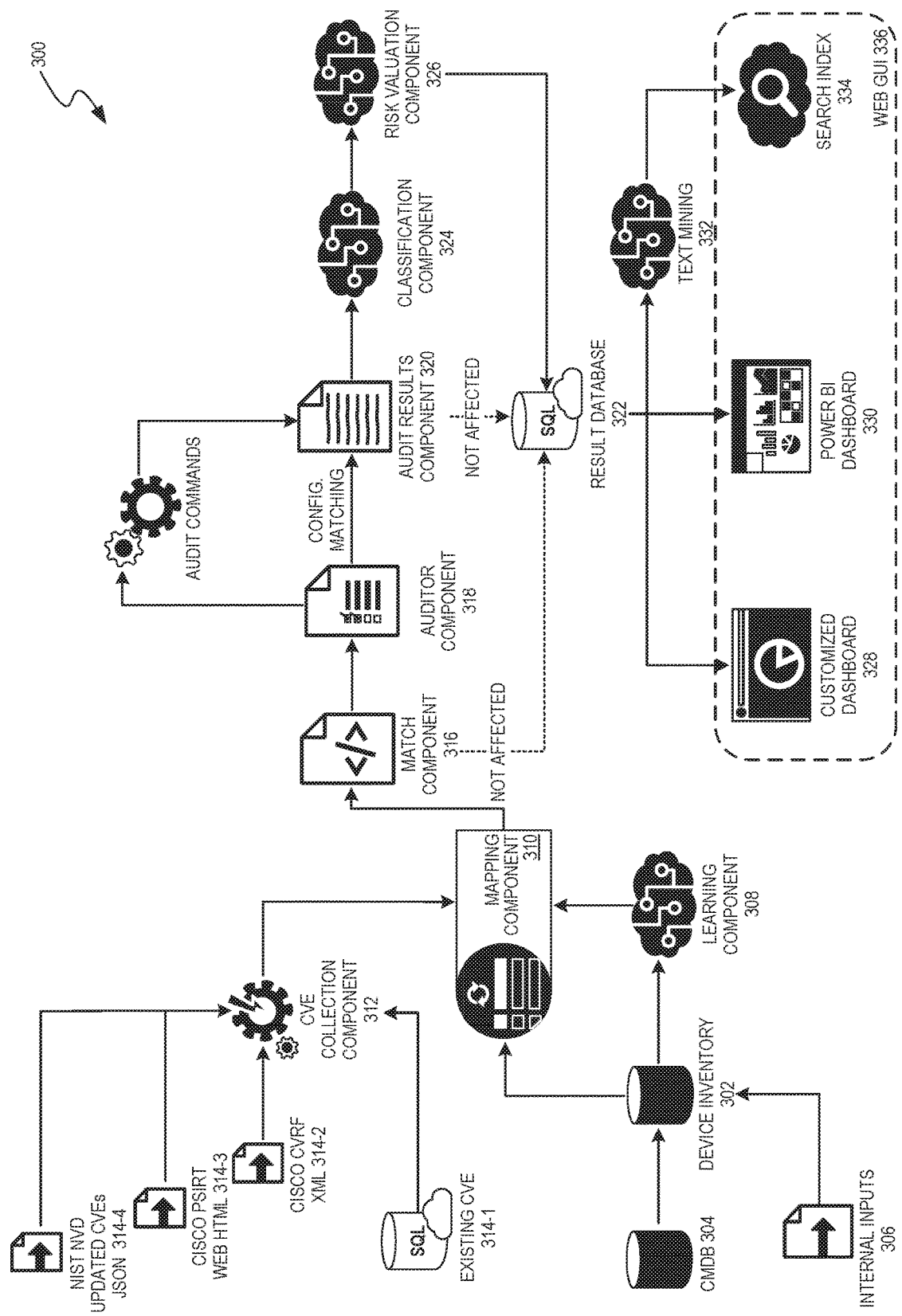
FIG. 3 is a block diagram that depicts analytics processes of a vulnerability management system (VMS).

FIG. 3 is a block diagram that depicts analytics processes of a VMS. The VMS 300 includes an inventory database 302 of an organization's computer system. The inventory database 302 collects system-specific information about computer assets of the computer system. For example, the system inventory database can receive and store version data of hardware and software assets, as well as configuration information, from a configuration management database (CMDB) 304 and other internal inputs 306.

The system-specific information is fed from the inventory database 302 to a learning component 308 and/or mapping component 310. For example, the system inventory database 302 can extract system-specific information from tables of the CMDB 304 on a periodic basis (e.g., once per day). The learning component 308 can transform the system-specific information with a machine learning (ML) process that includes a data cleaning function, merging of different sources, and adaptive remapping.

A CVE collection component 312 receives CVEs from sources including an existing CVE database source 314-1, a CISCO CVRF XML source 314-2, a CISCO PSIRT Web hypertext markup language (HTML) source 314-3, and a NIST NVD source 314-2 with CVEs in JSON format. The CVE collection component 312 can periodically (e.g., twice per day) extract the JSON, HTML, XML file with custom scripts. The CVE collection component 312 can harmonize the vulnerability information collected from the various sources 314-1 through 314-4 by updating and cleaning vulnerability information.

The mapping component 310 can adaptively map the vulnerability information from the CVEs and the system-specific information to identify any potential vulnerabilities based on, for example, the type of computer asset and version described in the vulnerability information. For example, the mapping component 310 can load the collected vulnerability information and system-specific information to staging tables and update working tables for any new or changed information. The matching component 316 matches information of computer assets in the vulnerability information with the system-specific information. For example, the matching component 316 can match a device type, version, and/or configuration of one computer asset in the vulnerability information to system-specific information of another computer asset.

In some embodiments, the VMS 300 can include an auditor component 318 to perform an administrative review of system-specific computer assets matching vulnerability information. The auditing can be performed with audit commands. That is, the auditor component 318 can use audit commands to obtain results for an audit results component 320. The auditing process can include extracting input from an auditor, transforming the inputs with version matching, and computing results periodically (e.g., daily) or on-demand. The auditing process can use a custom script to extract computer asset information in a background process and load the extracted information to stage results in the audit results component 320.

The vulnerability information that did not match system-specific information is fed to a results database 322. In some embodiments, the results database 322 stores the results in tables. The vulnerability information that matches system-specific information can feed a classification component 324 to classify identified vulnerabilities. The output of the classification component 324 is then fed to a risk valuation component 326 to determine the scope of the risk and/or the degree of the risk due to the identified vulnerability. The output of the risk valuation component 326 is fed to the results database 322. The classification component 324 and the risk valuation component 326 can transform data in accordance with an ML process.

The results of the vulnerability analytics are available by users in a variety of ways over a variety of means such as a web graphical user interface (GUI) 336. In some embodiments, the results are loaded to a cloud-based database for cognitive services and a power business intelligence (BI) data visualization tool. For example, a customized dashboard 328 or power BI dashboard 330 can provide access to the results database 322. In another example, a text mining component 332 extracts text from the results database 322 for a search index 334 that is accessible from the web GUI 336. As such, a user can readily access analytics information rather than being tasked to process vulnerability information manually.

Figure 4:
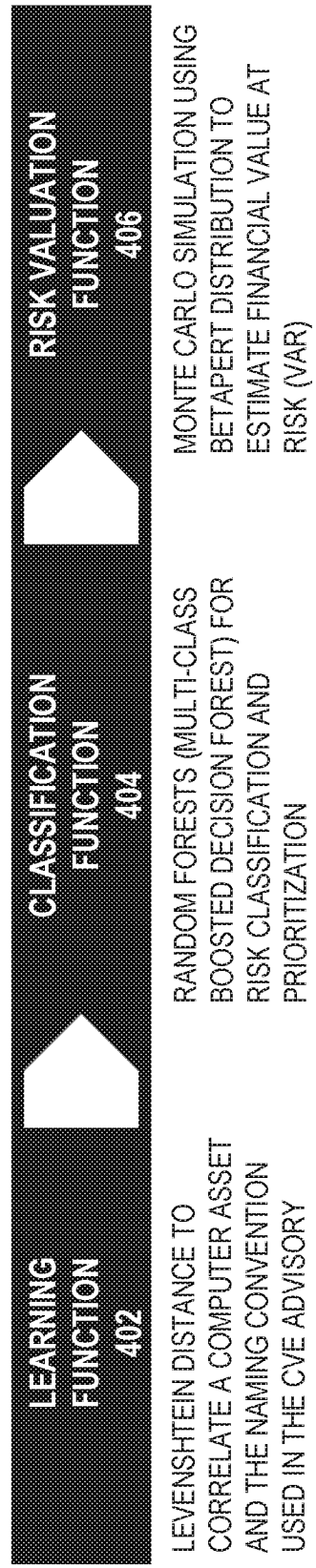
FIG. 4 depicts functions of ML integration to adapt a VMS based on diverse vulnerability information.

FIG. 4 depicts functions of ML integration 400 to adapt a VMS based on diverse vulnerability information. For example, a learning function 402 (e.g., of learning component 308) can implement a Levenshtein distance function to correlate a computer asset and a naming convention used in a vendor-specified CVE advisory. That is, the learning function 402 can calculate Levenshtein distances of known vulnerabilities relative to computer assets of the subject computer system. The distances can be ranked as measures of relevance between the known vulnerabilities and the computer assets of the computer system. For example, shorter distances that indicate greater relevance are ranked higher than larger distances that indicate less relevance. The learning function 402 can then identify a potential vulnerability based on the rank of the distances (e.g., highly ranked distances).

The classification function 404 (e.g., of classification component 324) can implement a vulnerability classification algorithm such as a Random Forests algorithm for risk classification and prioritization. An example of the Random Forests algorithm is a multi-class boosted decision forests. The risk valuation function 406 (e.g., of risk valuation component 326) can implement, for example, a Monte Carlo simulation by using a BetaPERT distribution to estimate a financial value of a risk based on the identified risk of a computer system.

Figure 5:
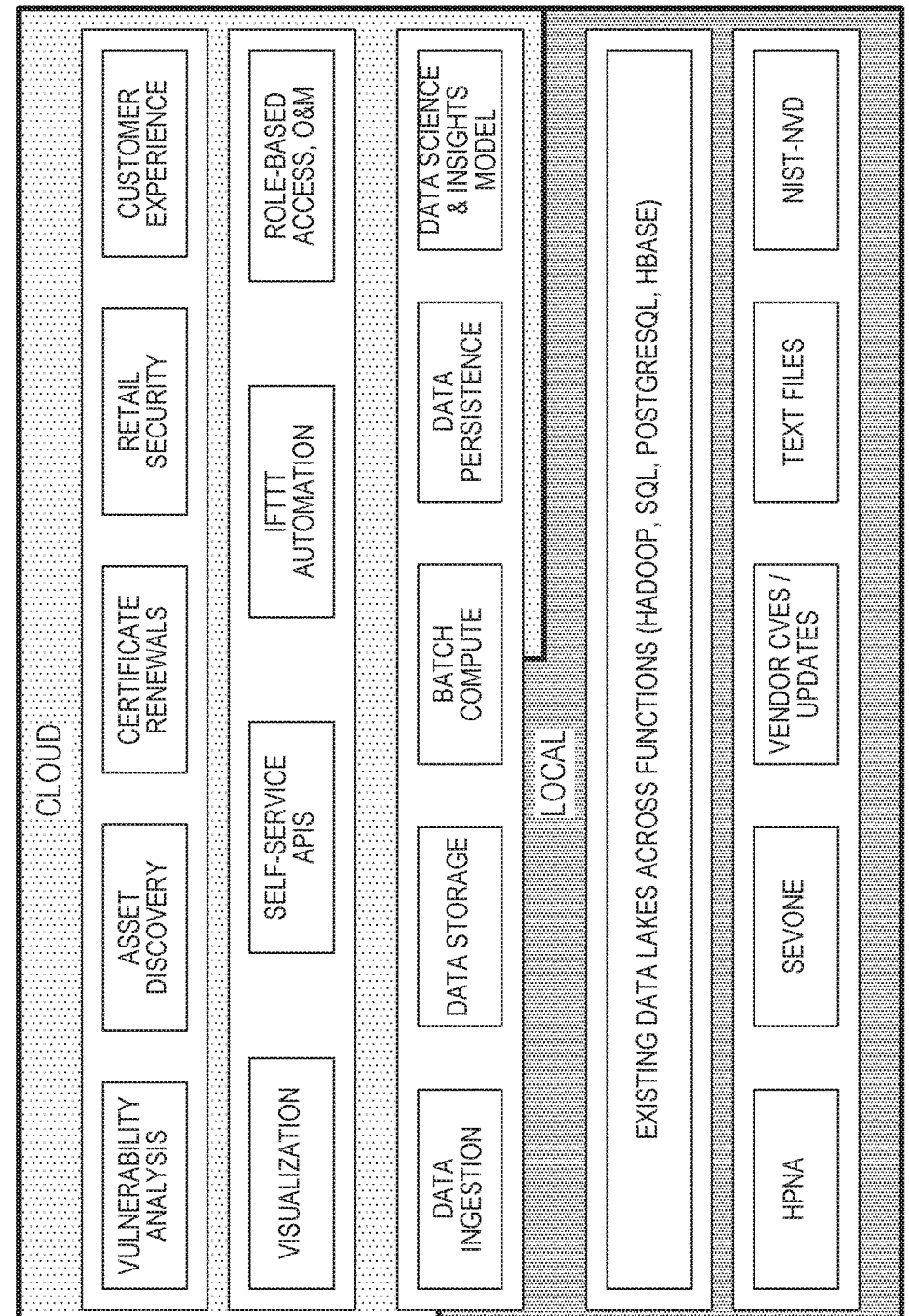
FIG. 5 depicts a hybrid cloud layer architecture of a VMS.

FIG. 5 depicts a hybrid cloud layer architecture of a VMS. The lowest layer of the architecture 500 is a data sources layer 502. Examples of data sources include HNPA, SEVONE, vendor advisories and updates, text files, and the NIST-NVD source. A data lake layer 504 on top of the data sources layer 502 collects data from the data sources. For example, existing data lakes can collect data across functions (e.g., HADOOP, SQL, PostgreSQL, and HBASE). The data sources layer 502 and data lake layer 504 can correspond to functions of a local component of the VMS.

An analytics platform layer 506 can reside in an interface between a cloud component of a vulnerability management architecture and a local component. The analytics platform is on top of the data lake layer 504. Examples of the functions that can be performed in the analytics platform includes data ingestion, data storage, batch compute, data persistence, and implement a data science and insights model. The cloud component of the illustrated vulnerability management system includes an insights and automation layer 508 on top of the analytics platform layer 506 and a solutions and data-driven decisions layer 510. Examples of functions associated with the insights and automation layer 508 includes visualization, self-service APIs, IFTTT automation, role-based access, and O & M. Examples of the functions associated with the solutions and data-driven decisions layer 510 includes vulnerability analysis, asset discovery, certificate renewals, retail security, customer experience, and other functions.

Closed loop automation of vulnerability remediation includes, for example, vulnerability remediation readiness assessment of device/node configuration, performance, and/or fault management. Other examples of remediation include integration with ticketing and change request handling systems including automated ticket generation and change request approval; automated method of procedure creation; administrative updates; change implementation for vulnerability remediation and pre- or post-validation; reporting updates; and vulnerability remediation audit and update triggers.

Figure 6:
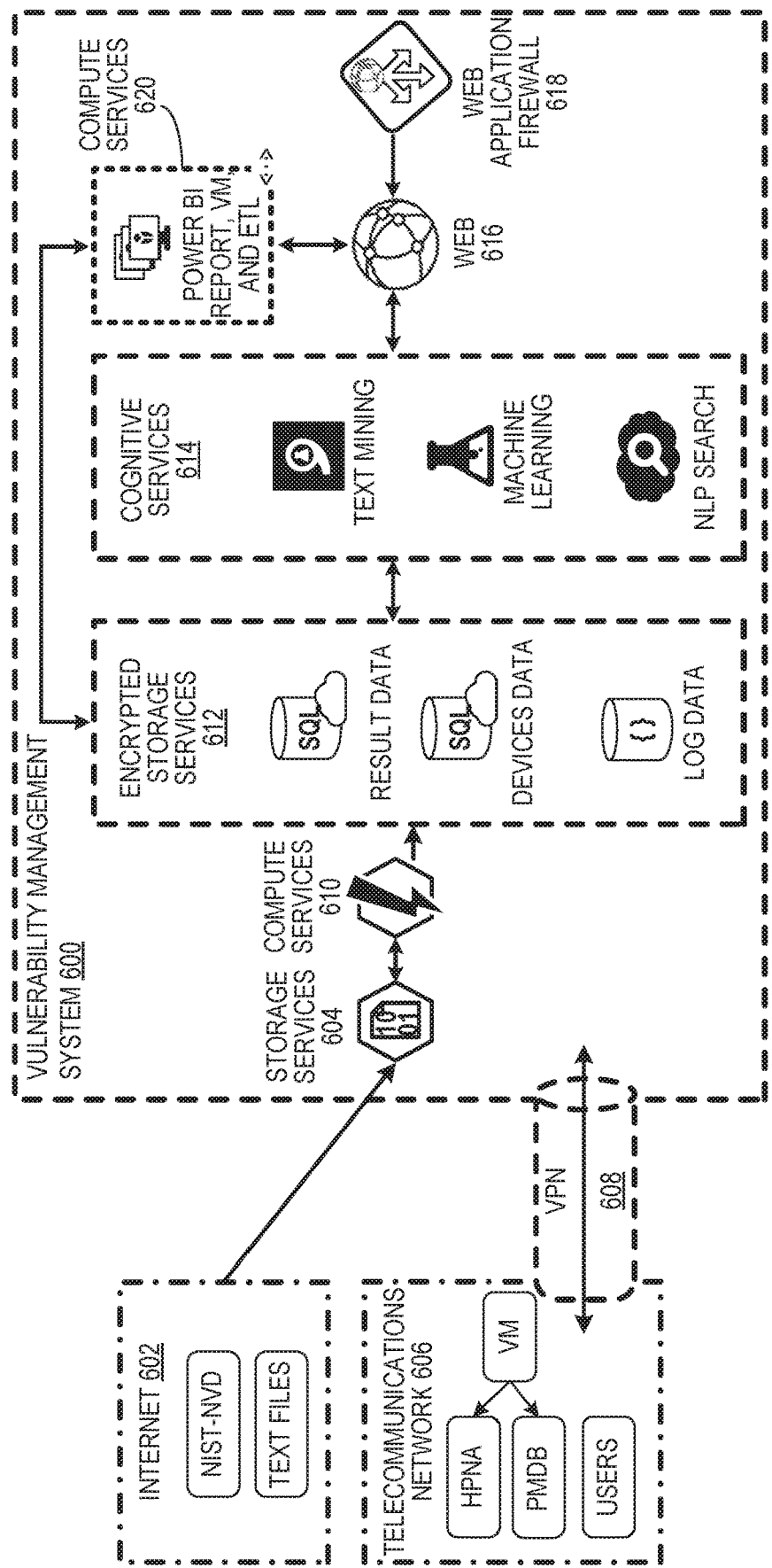
FIG. 6 is a block diagram that depicts analytics processes in a hybrid cloud architecture of a VMS.

FIG. 6 is a block diagram that depicts analytics processes of a hybrid cloud architecture of a VMS. As shown, the VMS 600 includes a combination of cloud-based components. An internet component 602 includes sources of vulnerability information such as the NIST-NVD and text files, which communicate vulnerability information and/or other data to the VMS 600. A telecom network 606 includes data sources such as a configuration inventory (e.g., CMDB) and a network performance monitoring service (e.g., performance management database (PMDB)), which communicates with a virtual machine. The telecom network 606 also includes user input. As shown, the telecom network 606 communicates vulnerability information or other data to the VMS 600 through a virtual private network (VPN) 608 (e.g., an express route VPN).

The VMS 600 includes storage services 604 that receive data from the internet component 602. The storage services 604 can, for example, store data in an encrypted BLOB. The storage services 604 communicate with compute services 610, which can perform extract-transform-load (ETL) services. The output of the compute services 610 is fed to encrypted storage services 612, which store encrypted data in various databases including SQL databases for result data and devices data. The encrypted storage services 612 also includes a log data database (e.g., SEQLOG).

The encrypted storage services 612 is communicatively coupled to cognitive services 614. As shown, the cognitive services 614 includes functions for text mining, machine learning, and NLP search capabilities. The cognitive services 614 is communicatively coupled to web services 616, which is communicatively coupled to a web application firewall (WAF) 618. The web services 616 is communicatively coupled to compute services 620, which can provide power BI reporting, virtual machines, and ETL services. The compute services 620 loops back to the encrypted storage services 612 to enable routine comprehensive analytics processes.

Figure 7:
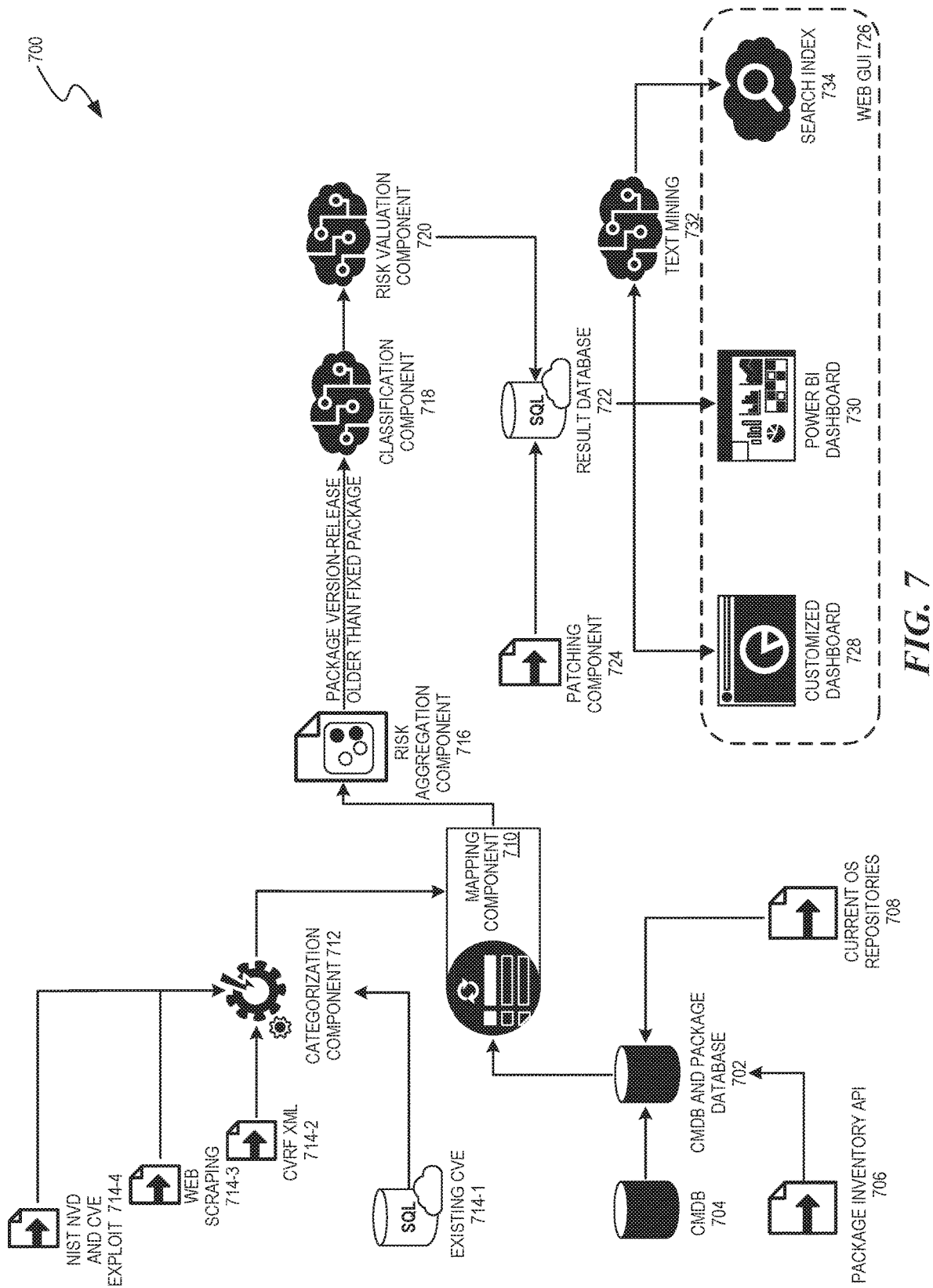
FIG. 7 is a block diagram that depicts processes for closed looped analytics in a VMS.

FIG. 7 is a block diagram that depicts processes for closed looped analytics of a VMS. As shown, the VMS 700 can be implemented for a system (e.g., RED HAT Enterprise Linux system) but is otherwise similar to the VMS 300. For example, the VMS 700 includes a configuration management database (CMDB) and package database 702 that stores information related to computer assets. For example, the CMDB and package database 702 can receive and store version data and release data of hardware and software assets, which is obtained from a CMDB 704 and through a package inventory application programming interface (API) 706. The current operating system (OS) repositories 708 also feed the CMDB and package database 702. The CMDB and package database 702 can extract system-specific information on a periodic basis (e.g., daily). The aggregate system-specific information of the CMDB and package database 702 is fed to a mapping component 710.

A categorization component 712 (e.g., fixed packages categorization) receives vulnerability information from various sources including an existing CVE database 714-1, a CVRF XML source 714-2, a web scraping source 714-3, and a NIST NVD source 714-3 with CVE exploits 714-4. The categorization component 712 can periodically (e.g., twice per day) extract JSON, HTML, or XML documents with custom scripts. The categorization component 712 can clean, update, and harmonize the CVEs collected from the sources 714-1 through 714-4.

The mapping component 710 maps vulnerability information to system-specific information based on, for example, the version and release information. For example, the mapping component 710 can collect and load vulnerability information and system-specific information on staging tables and update working tables for any new or changed information. A risk aggregation component 716 can determine a risk to the computer system based on vulnerability information matching system-specific information by using the tables of the mapping component 710. In one example, the output of the risk aggregation component 716 includes package version-release information older than a fixed package, which is fed to a classification component 718 to classify this vulnerability.

The output of the classification component 718 is fed to a risk valuation component 720, which can determine a scope of the risk and/or degree of the risk due to an identified vulnerability. The output of the risk valuation component 720 is fed to the results database 722. The classification component 718 and the risk valuation component 720 can transform data in accordance with an ML process. A patching component 724 can provide patch information including a scope and status of a patch for a vulnerability, which can be stored on one or more tables in the results database 722.

The content of the results database 722 are available by users in a variety of ways on, for example, a web GUI 726. In some embodiments, the results are loaded to a cloud-based database for cognitive services and a power BI. For example, a customized dashboard 728 can enable access to the results stored in the results database 722 over a network. In another example, a power BI dashboard 730 can enable access to the results stored in the results database 722. In another example, a text mining component 732 extract text from the results database 722 to populate a search index 734. As such, a user can obtain information about how vulnerability information is processed rather than being solely responsible for processing the vulnerability information manually.

The results of the vulnerability analytics are available by users in a variety of ways over a variety of means such as a web graphical user interface (GUI) 726. In some embodiments, the results are loaded to a cloud-based database for cognitive services and a power BI data visualization tool. For example, a customized dashboard 728 or power BI dashboard 730 can provide access to the results database 722. In another example, a text mining component 732 extracts text from the results database 722 for a search index 734 that is accessible from the web GUI 726. As such, a user can readily access analytics information rather than being tasked to process vulnerability information manually.

Figure 8:
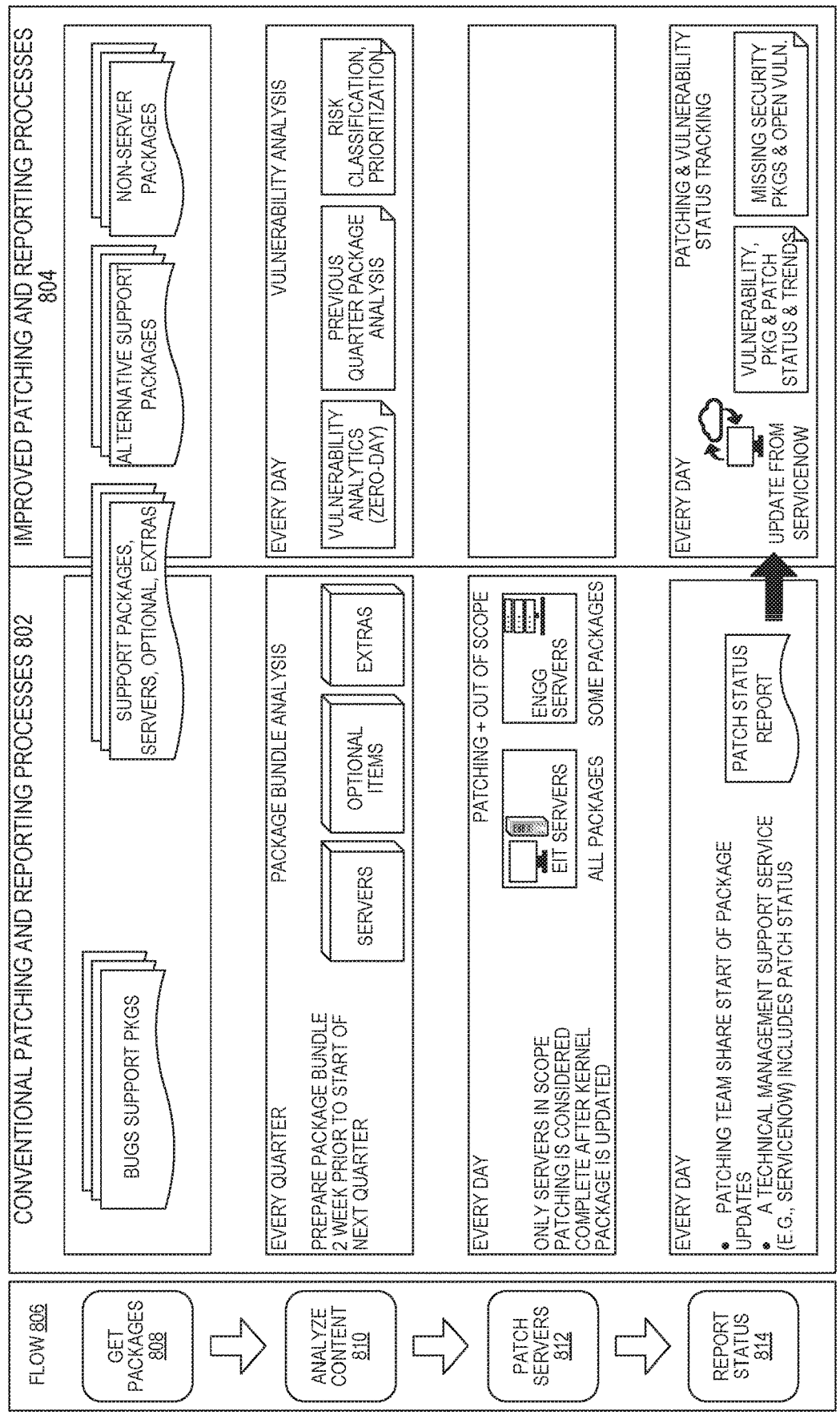
FIG. 8 is a block diagram that depicts patching and reporting processes.

FIG. 8 is a block diagram that depicts patching and reporting processes. Specifically, FIG. 8 compares conventional patching and reporting processes 802 with improved processes 804. Both share a common flow 806, which includes getting packages 808, analyzing package content 810, patching servers 812, and a reporting status 814.

For getting packages 808, the conventional processes 802 and improved processes 804 share some common packages. For analyzing package content 810, content analysis in the conventional processes 802 can occur quarterly based on package bundles that are prepared about two weeks prior to the start of a next quarter. The package bundle analysis can include an analysis of servers, optional items, and extras. In contrast, content analysis in the improved processes 804 can occur daily. The package bundle analysis includes a vulnerability analysis, which includes analytics at day zero, previous quarter package analysis, and risk classification and prioritization. For patching servers 812, the conventional processes 802 patch only servers in scope by applying all packages to some types of servers and some packages to other types of servers. The patching only occurs with servers within a scope of package patches. For reporting status 814, the conventional processes 802 require a patching team to share a start of package updates and a patch status to provide a patch report status. The sharing is performed daily. In contrast, the improved processes 804 can perform updates on a daily basis from a technical management support service. The improved processes 804 also provide patching a vulnerability status tracking with vulnerability package and patch status and trends, as well as indicating missing security packages and reporting open vulnerabilities.

Figure 9:
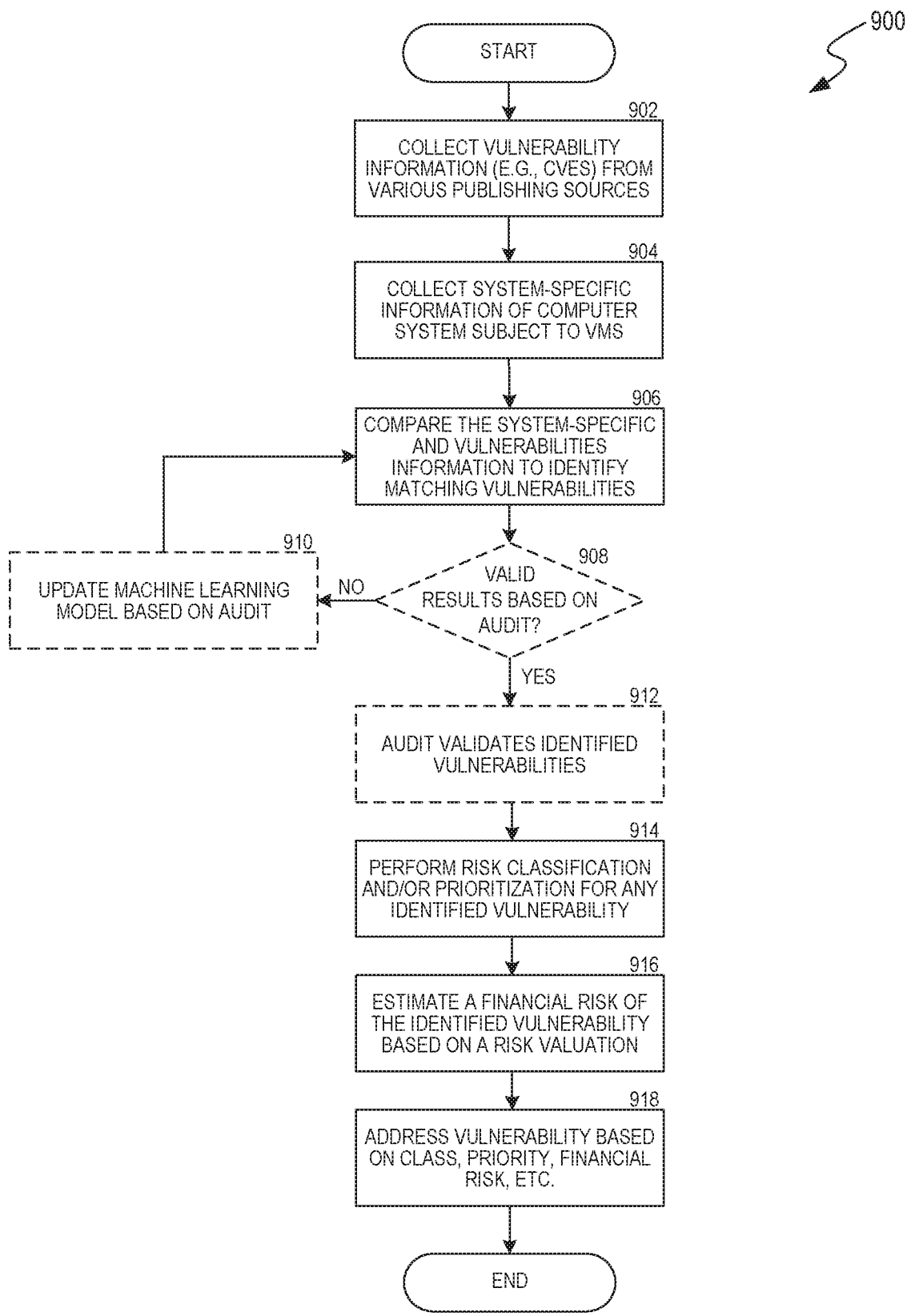
FIG. 9 is a flow diagram that illustrates processes of a VMS to identify, classify, and mitigate vulnerabilities.

FIG. 9 is a flowchart of processes performed by a VMS to identify, classify, and mitigate vulnerabilities. In 902, the VMS can collect vulnerability information over network(s) from various publishing sources. The vulnerability information can include known vulnerabilities that are associated with computer assets (e.g., hardware, software or a configuration). For example, the vulnerability information can include CVEs that are published online by vendors of the computer assets.

Examples of publishing sources include vendors that advise organizations of known vulnerabilities associated with their computer assets. The organizations can access CVE information on vendor websites or other portals. The organizations can access the CVEs directly from vendors and/or from a third-party intermediary such as the NIST's NVD, which essentially republishes CVEs obtained from vendors. The CVEs can have different data formats including JSON, HTML, XML, etc. The CVEs can be in human-readable format and/or in machine-readable format. For example, the NVD feeds other organizations CVEs in a common machine-readable, semi-structured data format. Another example includes CISCO PSIRT advisories in human-readable HTML format. Another example is a device configuration advisory, which includes structured data in a data warehouse that can be accessed with an API. Yet another example includes vendor emails that are part of a subscription or premium support. Yet another example includes vulnerability tools such as bug search or software checker tools for manually searching and exporting vulnerability information. The vulnerability information can be obtained from publishing sources automatically or on-demand. For example, the VMS can periodically collect CVEs over the Internet from vender websites.

In 904, the VMS collects system-specific information of the computer system subject to vulnerability management. The system-specific information includes information about computer assets of the computer system. Examples include a model, type, version, date release, updates, patches, settings, and any other information that is useful for characterizing the computer assets. The system-specific information can be maintained in a memory of the VMS such as data tables in the memory.

In 906, the VMS processes the vulnerability information and the system-specific information collectively to identify potential vulnerabilities. For example, the VMS can interpret human-readable CVEs with NLP to automatically obtain interpreted CVEs. The VMS correlates the interpreted CVEs with the collected system-specific information to identify matching computer assets in the CVEs. The correlation can be performed in accordance with a ML process or model. For example, the ML model can be trained on the system-specific information of a computer system and learn about its computer assets as the computer system is analyzed for vulnerabilities.

In some embodiments, the VMS can perform a similarity analysis between computer assets in CVEs and the computer system. For example, the VMS can perform a matching process between the collected vulnerability information and an inventory of computer assets in the system-specific information. As such, the VMS identifies potential vulnerabilities when a computer asset of the computer system matches a known vulnerability in a CVE. As used herein, a "match" may refer to a threshold degree of similarity between a known vulnerability and system-specific information. For example, the threshold may require a substantial match (e.g., more than 50 percent).

The VMS can determine a relevance score of for a match and identify a potential vulnerability based on the relevance score. In a specific example, correlating involves calculating a Levenshtein distance of the known vulnerability to a computer asset of a target computer system. The Levenshtein distances can be ranked as relative measures of relevance between the known vulnerabilities and computer assets of the target computer system. The VMS selects a vulnerability based on the rank of the Levenshtein distances to the computer assets of the target computer system.

For example, $$D(i, j) = \text{score of the best alignment for } s1 \ldots si \text{ to } t1 \ldots tj =$$

$$\min \begin{cases} D(i-1, j-1) + d(si, tj) & // \, subst/\text{copy} \\ D(i-1, j) + 1 & // \, \text{insert} \\ D(i, j-1) + 1 & // \, \text{delete} \end{cases}$$

let d (c, d)=0 if c=d, 1 else); also let D (i, 0)=I (for i inserts) and D (0, j)=j. TABLE 1 shows examples of Levenshtein distances between computer assets in CVEs and computer assets of the computer system.

| Computer Asset - Name 1 | Computer Asset - Name 2 | Distance |
|---|---|---|
| 1800 Integrated Services Router | Cisco IOS | 5 |
| 5500 Series Wireless Controllers | Transponders | 6 |
| Nexus 9000 Series Switches | Cisco Nexus 9000 Series Switches | 6 |
| Nexus 7000 Series Switches | Cisco Nexus 7000 Series Switches | 6 |
| Nexus 5000 Series Switches | Cisco Nexus 5000 Series Switches | 6 |
| Nexus 3000 Series Switches | Cisco Nexus 3000 Series Switches | 6 |
| Catalyst 6500 Series Switches | Cisco Catalyst 6500 Series Switches | 6 |
| Aironet 1240AG Series Access Point | Cisco Aironet 1400 Series | 9 |
| Aironet 1240AG Series Access Point | Aironet 1240AG Series Access Point | 9 |
| Aironet 1240AG Series Access Point | Cisco Aironet 1200 Series | 9 |

In 908, the VMS can optionally assess results of a manual audit performed by a human analyst. For example, a human analyst can manually check whether an identified vulnerability has been correctly identified. In 910, the VMS receives an indication that an identified vulnerability is incorrect and, as such, the VMS can learn for subsequent analyses. In 912, the VMS receives an indication that the identified vulnerability is valid. Either outcome can be stored in a results database to take subsequent actions based on whether the identified vulnerability is valid or not.

In 914, the VMS can perform risk classification and/or prioritization for any identified vulnerability. For example, the VMS can process an identified vulnerability with a decision algorithm to classify the risk of the identified vulnerability to an organization. A decision algorithm can take in to account the following: public knowledge about exploited vulnerabilities including available exploit code; private information such as network topology and placement of the device/node, external IP facing considerations, hosted data assets (PCI, SOX, PII, restricted/confidential data); CVSS string which includes attack vectors, access vectors, attack complexity, access privileges, confidentiality, integrity and availability; and/or corporate security policies.

An example of a decision algorithm is a multi-class boosted random forests algorithm, which can perform a bootstrap and then aggregate to achieve a computationally efficient and scalable solution for classifying identified vulnerabilities. This multi-class classifier is less prone to overfitting compared to using neural networks. Although other types of classifiers such as an SVM two-class classifier are also available, a multi-class classifier can be more robust to outliers.

In 916, the VMS can estimate a financial risk of the identified vulnerability based on a risk valuation. For example, the risk valuation can be based on a Monte Carlo simulation by using a beta-PERT distribution. As such, an organization can assess the financial risk to the organization based on the identified vulnerability. In some embodiments, the estimate quantifies financial risk in terms of cost impact for classified vulnerabilities on a five-point rating scale. A likelihood of financial risk or cost can be factored-in based on public knowledge about exploited vulnerabilities including available exploit code as well as network topology and device/node placement, and CVSS string.

In 918, the VMS can address the risk of an identified vulnerability in a variety of ways. For example, the VMS can use a network interface to obtain a software patch to address a software vulnerability. The software patch may be identified in the CVE. The VMS can download the software patch from the vendor of the vulnerable software through a vendor portal (e.g., website).

Figure 10:
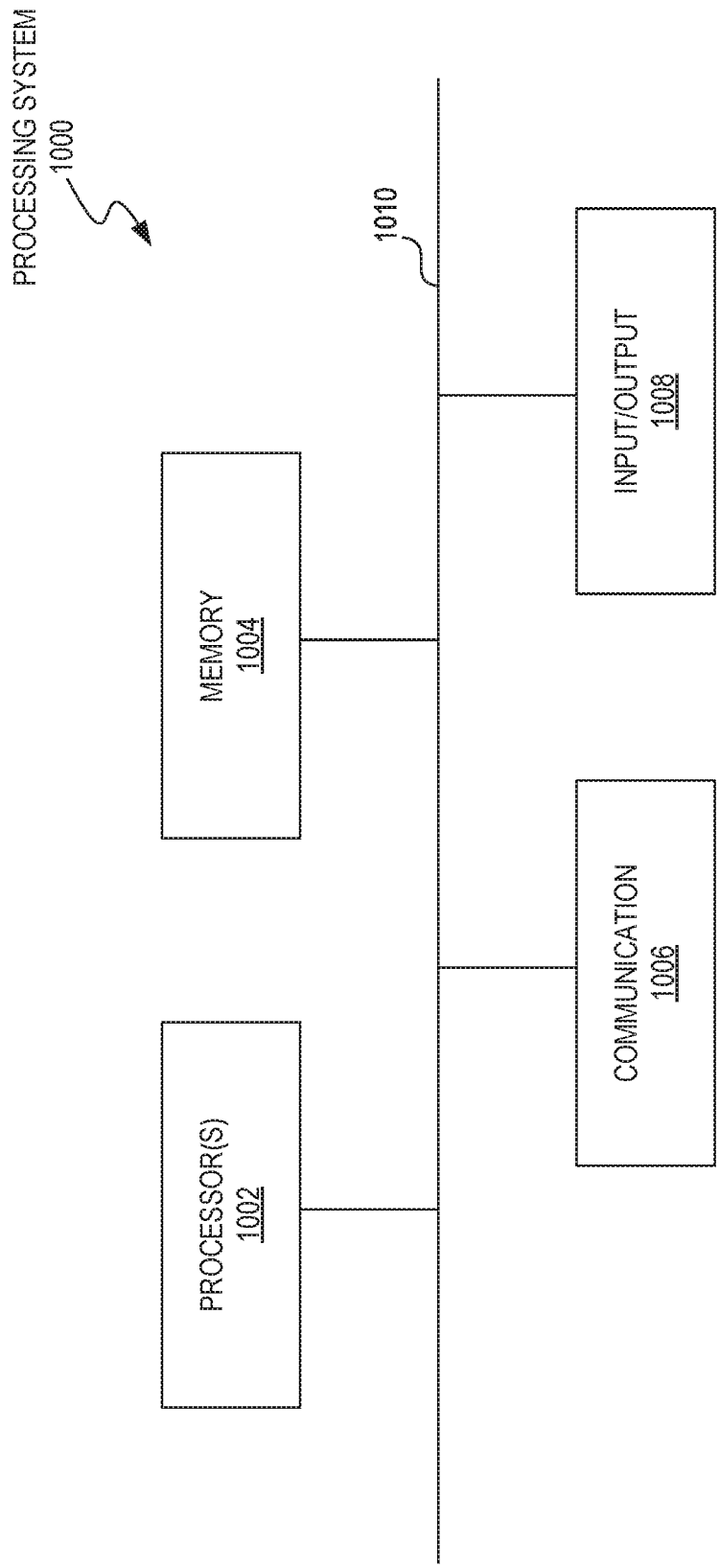
FIG. 10 is a block diagram that illustrates an example processing system in which aspects of the disclosed technology can be embodied.

FIG. 10 is a block diagram illustrating an example of a processing system 1000 in which at least some operations described herein can be implemented. The processing system 1000 represents a system that can run any of the methods/algorithms described herein. For example, any network access device (e.g., user device) component of a network can include or be part of a processing system 1000. The processing system 1000 can include one or more processing devices, which can be coupled to each other via a network or multiple networks. A network can be referred to as a communication network or telecommunications network.

In the illustrated embodiment, the processing system 1000 includes one or more processors 1002, memory 1004, a communication device 1006, and one or more input/output (I/O) devices 1008, all coupled to each other through an interconnect 1010. The interconnect 1010 can be or include one or more conductive traces, buses, point-to-point connections, controllers, adapters and/or other conventional connection devices. Each of the processor(s) 1002 can be or include, for example, one or more general-purpose programmable microprocessors or microprocessor cores, microcontrollers, application specific integrated circuits (ASICs), programmable gate arrays, or the like, or a combination of such devices.

The processor(s) 1002 control the overall operation of the processing system 1000. Memory 1004 can be or include one or more a physical storage facilities, which can be in the form of random-access memory (RAM), read-only memory (ROM) (which can be erasable and programmable), flash memory, miniature hard disk drive, or other suitable type of storage device, or a combination of such devices. Memory 1004 can store data and instructions that configure the processor(s) 1002 to execute operations in accordance with the techniques described above. The communication device 1006 can be or include, for example, an Ethernet adapter, cable modem, Wi-Fi adapter, cellular transceiver, Bluetooth transceiver, or the like, or a combination thereof. Depending on the specific nature and purpose of the processing system 1000, the I/O devices 1008 can include devices such as a display (which can be a touch screen display), audio speaker, keyboard, mouse or other pointing device, microphone, camera, etc.

While processes or blocks are presented in a given order, alternative embodiments can perform routines having steps or employ systems having blocks, in a different order, and some processes or blocks can be deleted, moved, added, subdivided, combined and/or modified to provide alternative or sub-combinations, or can be replicated (e.g., performed multiple times). Each of these processes or blocks can be implemented in a variety of different ways. In addition, while processes or blocks are at times shown as being performed in series, these processes or blocks may instead be performed in parallel, or can be performed at different times. When a process or step is "based on" a value or a computation, the process or step should be interpreted as based at least on that value or that computation.

Software or firmware to implement the techniques introduced here can be stored on a machine-readable storage medium and can be executed by one or more general-purpose or special-purpose programmable microprocessors. A "machine-readable medium", as the term is used herein, includes any mechanism that can store information in a form accessible by a machine (a machine can be, for example, a computer, network device, cellular phone, personal digital assistant (PDA), manufacturing tool, any device with one or more processors, etc.). For example, a machine-accessible medium includes recordable/non-recordable media (e.g., read-only memory (ROM), random-access memory (RAM), magnetic disk storage media, optical storage media, flash memory devices), etc.

Note that any and all of the embodiments described above can be combined with each other, except to the extent that it may be stated otherwise above, or to the extent that any such embodiments might be mutually exclusive in function and/or structure. Although the present invention has been described with reference to specific exemplary embodiments, it will be recognized that the invention is not limited to the embodiments described but can be practiced with modification and alteration within the spirit and scope of the disclosed embodiments. Accordingly, the specification and drawings are to be regarded in an illustrative sense rather than a restrictive sense.

Physical and functional components (e.g., devices, engines, modules, and data repositories) associated with processing system 1000 can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip. The tangible storage memory can be computer-readable data storage. The tangible storage memory can be volatile or non-volatile memory. In some embodiments, the volatile memory can be considered "non-transitory" in the sense that it is not a transitory signal. Memory space and storage described in the figures can be implemented with the tangible storage memory as well, including volatile or non-volatile memory.

Each of the functional components can operate individually and independently of other functional components. Some or all of the functional components can be executed on the same host device or on separate devices. The separate devices can be coupled through one or more communication channels (e.g., wireless or wired channel) to coordinate their operations. Some or all of the functional components can be combined as one component. A single functional component can be divided into sub-components, each sub-component performing separate method steps or a method step of the single component.

In some embodiments, at least some of the functional components share access to a memory space. For example, one functional component can access data accessed by or transformed by another functional component. The functional components can be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implement a portion of the functional components). Other arrays, systems and devices described above can include additional, fewer, or different functional components for various applications.

Aspects of the disclosed embodiments can be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number can also include the plural or singular number respectively. The word "or," in reference to a set of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively or additionally, network elements performing those functions could be replaced by two or more elements to perform portions of those functions. In addition, while processes, message/data flows, or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes, message/data flows, or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges. Those skilled in the art will also appreciate that the actual implementation of a database can take a variety of forms, and the term "database" is used herein in the generic sense to refer to any data structure that allows data to be stored and accessed, such as tables, linked lists, arrays, etc.

The teachings of the methods and system provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the technology can be modified, if necessary, to employ the systems, functions, and concepts of the various references described above to provide yet further embodiments of the technology.

These and other changes can be made to the invention in light of the above Detailed Description. While the above description describes certain embodiments of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as embodied in a computer-readable medium, other aspects can likewise be embodied in a computer-readable medium. Accordingly, the inventors reserve the right to add additional claims after filing the application to pursue such additional claim forms for other aspects of the technology.

We claim:

1. A method for adaptive vulnerability management of a computer system, the method comprising:
   collecting vulnerability information over a network from a publishing source,
      wherein the vulnerability information includes a known vulnerability of a first computer asset,
      wherein the vulnerability information includes a set of cybersecurity vulnerabilities and exposures (CVEs) published on a public network,
      at least some of the CVEs being in a human-readable format;
   collecting system information of the computer system, the computer system being subject to the vulnerability management,
      wherein the system information includes information about a second computer asset of the computer system; and processing the collected vulnerability information and the collected system information by:
  interpreting at least some of the human-readable CVEs with natural language processing (NLP) and correlating the interpreted CVEs with the collected system information;
  identifying a potential vulnerability of the second computer asset based on a correlation between the interpreted CVEs and the collected system information;
  storing, in a cloud-based results database, a subset of the collected vulnerability information,
    wherein the subset of the collected vulnerability information does not match the collected system information; and
  generating, based on text extracted from the subset of the collected vulnerability information stored in the cloud-based results database, a search index that is accessible from a web-based graphical user interface and enables access to processed analytics of the collected vulnerability information.

2. The method of claim 1, wherein the first computer asset includes a first hardware asset, a first software asset, or a first configuration of a first computer system, and the second computer asset includes a second hardware asset, a second software asset, or a second configuration of the computer system.

3. The method of claim 1, wherein processing the collected vulnerability information and the collected system information comprises:
  correlating the interpreted CVEs with the collected system in accordance with a machine learning (ML) model, the ML model being trained based on the collected system information of the computer system.

4. The method of claim 1, wherein the correlating comprises:
  calculating a Levenshtein distance of the known vulnerability to the second computer asset;
  ranking the Levenshtein distance as a measure of relevance between the known vulnerability and the second computer asset; and
  identifying the potential vulnerability based on the rank of the Levenshtein distance to the second computer asset.

5. The method of claim 1, wherein the correlating comprises:
  performing a similarity analysis between the first computer asset and the second computer asset.

6. The method of claim 1, wherein the correlating comprises:
  determining a relevance score of the second computer asset based on the known vulnerability; and
  identifying the potential vulnerability based on the relevance score.

7. The method of claim 1 further comprising:
performing a risk classification and prioritization of the potential vulnerability based on a multi-class boosted decision forests algorithm.

8. The method of claim 1 further comprising:
estimating a financial risk of the potential vulnerability by performing a risk valuation of the potential vulnerability based on a Monte Carlo simulation by using a beta-PERT distribution.

9. The method of claim 1 further comprising:
estimating a financial risk of the potential vulnerability by performing a risk valuation of the potential vulnerability.

10. The method of claim 1, wherein the vulnerability information comprises a file formatted in JavaScript Object Notation (JSON), Hypertext Markup Language (HTML), or Extensible Markup Language (XML).

11. The method of claim 1, wherein the publishing source comprises a public national vulnerability database (NVD) that obtains the vulnerability information from a vendor of the first computer asset.

12. The method of claim 1, wherein the publishing source comprises a vendor of the first computer asset and the vulnerability information is obtained directly from the vendor.

13. The method of claim 1, wherein the potential vulnerability is a first potential vulnerability, and at least some of the CVEs are in a machine-readable format, the method further comprising:
  identifying a second potential vulnerability of a third computer asset of the computer system based on the correlation between the machine-readable CVEs and the collected system information.

14. The method of claim 1, wherein the publishing source comprises is a vendor of the first computer asset, and collecting the vulnerability information comprises:
  automatically obtaining vulnerability information periodically over the network from a website administered by the vendor.

15. The method of claim 1 further comprising:
periodically extracting vulnerability information from an online portal.

16. The method of claim 1, wherein the second computer asset is a software asset, the method further comprising:
  obtaining a software patch over the network for the software asset.

17. The method of claim 1 further comprising:
  receiving an indication that the potential vulnerability was validated as a vulnerability based on a manual review.

18. A vulnerability management system for a computer system, the system comprising:
  a network interface through which to obtain vulnerability information for computer assets over a network from network portals, wherein the network portals are for vendors of the computer assets;
  a storage facility configured to store inventory information of computer assets for the computer system and instructions for managing vulnerabilities of the computer system; and
  one or more processors configured to identify a vulnerability of the computer system based on the vulnerability information and the inventory information, where execution of the instructions causes the vulnerability management system to:
    cause the network interface to automatically collect vulnerability information periodically over the network from the network portals;
    perform a matching process of the collected vulnerability information to the inventory information of computer assets for the computer system;
    identify a vulnerability of the computer system as a match between a known vulnerability included in the inventory information and a computer asset listed in the inventory information of the computer system;
    classify a risk of the vulnerability based on a decision algorithm;
    estimate a financial risk of the vulnerability based on a risk valuation of the vulnerability; p2 store, in a cloud-based results database, a subset of the collected vulnerability information, wherein the subset of the collected vulnerability information does not match the inventory information; and generate, based on text extracted from the subset of the collected vulnerability information stored in the cloud-based results database, a search index that is accessible from a web-based graphical user interface and enables access to processed analytics of the collected vulnerability information.

19. The system of claim 18, wherein the vulnerability is identified based on a calculation of a Levenshtein distance between the known vulnerability and the computer asset.

20. At least one non-transitory computer-readable storage medium carrying instructions that, when executed by a vulnerability management system, cause the vulnerability management system to perform operations for identifying a vulnerability of a computer asset, the operations comprising:

collect vulnerability information including cybersecurity, vulnerabilities and exposures (CVEs) over a network from online sources, wherein at least some of the CVEs is in a human-readable format;

collect feature information of the computer asset subject to vulnerability management;

process the collected CVEs and the collected feature information by:

interpreting the human-readable CVEs using natural language processing (NLP) to understand a known vulnerability of a known computer asset;

calculating a Levenshtein distance between the known computer asset and the computer asset;

ranking the Levenshtein distance as a measure of relevance of the known computer asset to the computer asset; and identifying a potential vulnerability of the computer asset based on the rank of the Levenshtein distance;

perform a risk assessment of the potential vulnerability to determine a risk to a computer system that includes the computer asset;

store, in a cloud-based results database, a subset of the collected vulnerability information, wherein the subset of the collected vulnerability information does not match the collected feature information; and generate, based on text extracted from the subset of the collected vulnerability information stored in the cloud-based results database, a search index that is accessible from a web-based graphical user interface and enables access to processed analytics of the collected vulnerability information.

* * * * *